US006601290B2

(12) United States Patent
Stakem

(10) Patent No.: US 6,601,290 B2
(45) Date of Patent: Aug. 5, 2003

(54) TERMINAL APPLICATOR HAVING A RETRACTABLE CAM

(75) Inventor: Kerry Joseph Stakem, Hummelstown, PA (US)

(73) Assignee: Tyco Electronics Corp., Middletown, PA (US)

( * ) Notice: Subject to any disclaimer, the term of this patent is extended or adjusted under 35 U.S.C. 154(b) by 12 days.

(21) Appl. No.: 09/795,941

(22) Filed: Feb. 28, 2001

(65) Prior Publication Data

US 2002/0116814 A1 Aug. 29, 2002

(51) Int. Cl.[7] .................................................. B23P 19/00

(52) U.S. Cl. .............................. 29/742; 29/748; 29/753; 29/863

(58) Field of Search .......................... 29/742, 748, 753, 29/751, 755, 861, 863, 857; 72/409.06, 409.14, 413, 712, 405.07

(56) References Cited

U.S. PATENT DOCUMENTS 3,609,860 A * 10/1971 Hills ........................... 29/753
4,114,253 A * 9/1978 Loomis et al.
4,139,937 A * 2/1979 L'Homme ................... 29/748
4,214,361 A * 7/1980 Coldren et al. ............... 29/863
4,272,879 A * 6/1981 Wigby et al. ................. 29/863
4,426,772 A * 1/1984 Collier et al.
4,557,048 A * 12/1985 Cordeiro
4,979,291 A * 12/1990 Phillips et al.
5,174,022 A * 12/1992 Phillips et al.
5,706,570 A * 1/1998 Inoue et al.

FOREIGN PATENT DOCUMENTS

JP 08264257 A * 10/1996

* cited by examiner

*Primary Examiner*—Gregory Huson
*Assistant Examiner*—Khoa Huynh

(57) ABSTRACT

A machine (10) for terminating a conductor to an electrical terminal (34) of a partially assembled connector (16) includes a frame (12) and an anvil (20) supported by the frame arranged to receive the partially assembled connector. The connector has an insulating housing (32) wherein the terminal is positioned against a constriction 38 within the insulated housing and the terminal tabs (42) and barrel (40) are extending outside the housing. A ram (22) carrying crimping tooling (28) is in sliding engagement with the frame and arranged to undergo reciprocating motion in a crimping direction (24) into crimping engagement with the terminal and in an opposite return direction (26) away from the terminal. A housing feed mechanism (80, 86, 108, 110, 114, 122, 124, 126) is coupled to the frame and effects the pushing of the insulating housing over the terminal. A first cam (50) is coupled to the ram and arranged to engage and move a projection (80) of the housing feed mechanism to effect the pushing of the insulated housing over the terminal to a fully assembled position after the crimping operation is completed. The first cam is operable only during movement of the ram in the return direction.

5 Claims, 7 Drawing Sheets

TERMINAL APPLICATOR HAVING A RETRACTABLE CAM

The present invention relates to a machine for crimping an electrical terminal to a conductor and fully inserting the crimped terminal into the housing of a partially assembled connector by means of a housing feed mechanism, and more particularly to a retractable cam carried by the ram for actuating the housing feed mechanism only during the ram return stroke.

BACKGROUND OF THE INVENTION

Terminal applicator machines are widely used in the industry to attach electrical terminals to conductors. These terminal applicators are typically secured in a press which supplies the power and motion that operates the applicator. The applicator may be used manually where an operator inserts an already prepared wire end into the crimping area between a crimping tool and an anvil containing a terminal and holds the wire in place while activating the press to complete the termination. Alternatively, the terminal applicator and associated press may be attached to a host machine, such as a lead maker, where the prepared wire end is automatically presented to the applicator tooling for termination. Machines for terminating wires to terminals of partially assembled connectors typically feed a strip of the partially assembled connectors along a guide rail into a workstation where one of the terminals is positioned over an anvil. The wire, its end having been previously stripped of insulation, is positioned in the workstation and the apparatus is activated to cause crimping tools to engage and crimp the tabs of the terminal onto the end of the wire. The crimping tools are then withdrawn and a housing feed tool then slides the partially assembled insulated housing over the crimped portion of the terminal to complete the assembly of the connector. Such an apparatus is disclosed in U.S. Pat. No. 4,557,048, which issued Dec. 10, 1985 to Cordeiro. This apparatus performs both the crimping and pushing functions in a single workstation. The wire is securely clamped so that after the terminal is crimped onto the conductor, the upper crimp tooling can be withdrawn and the insulated housing pushed over the terminal. Another example of a similar apparatus is disclosed in U.S. Pat. No. 4,979,291 which issued Dec. 25, 1990 to Phillips et al. This apparatus also performs both the crimping and pushing functions in a single workstation. Both of these examples, however, utilize air cylinder actuated housing feed tools to push the insulated housing over the terminal and complete the assembly. Such machines require significant setup time to adjust the timing and assure that the pushing operation is complete before the next cycle is begun.

What is needed is a machine that crimps the wire and terminal, then slides the insulated housing over the crimped terminal to its fully assembled position by means of a mechanism actuated by the ram during its return stroke, thereby reducing the required set up time and, during operation, assuring that the assembly is completed prior to beginning the next crimping cycle.

SUMMARY OF THE INVENTION

A machine is disclosed for terminating a conductor to an electrical terminal of a partially assembled connector having an insulating housing wherein the terminal is positioned in a constriction within the insulated housing and the terminal tabs and crimping barrel are extending outside the housing.

The conductor is first crimped to the electrical terminal and then the insulated housing is pushed over the crimped electrical terminal to complete the assembly thereof. The machine includes a frame and an anvil supported by the frame arranged to receive the partially assembled connector. A ram carrying crimping tooling is in sliding engagement with the frame and arrange to undergo reciprocating motion in a crimping direction into crimping engagement with the terminal and in an opposite return direction away from the terminal. A housing feed mechanism is coupled to the frame and effects the pushing of the insulating housing over the terminal. A first cam is coupled to the ram and arranged to engage and move a projection of the housing feed mechanism to effect the pushing of the insulated housing over the terminal to a fully assembled position. The first cam is operable only during movement of the ram in the return direction.

An embodiment of the invention will now be described by way of example with reference to the following drawings.

DESCRIPTION OF AN EMBODIMENT OF THE INVENTION

Figure 1:
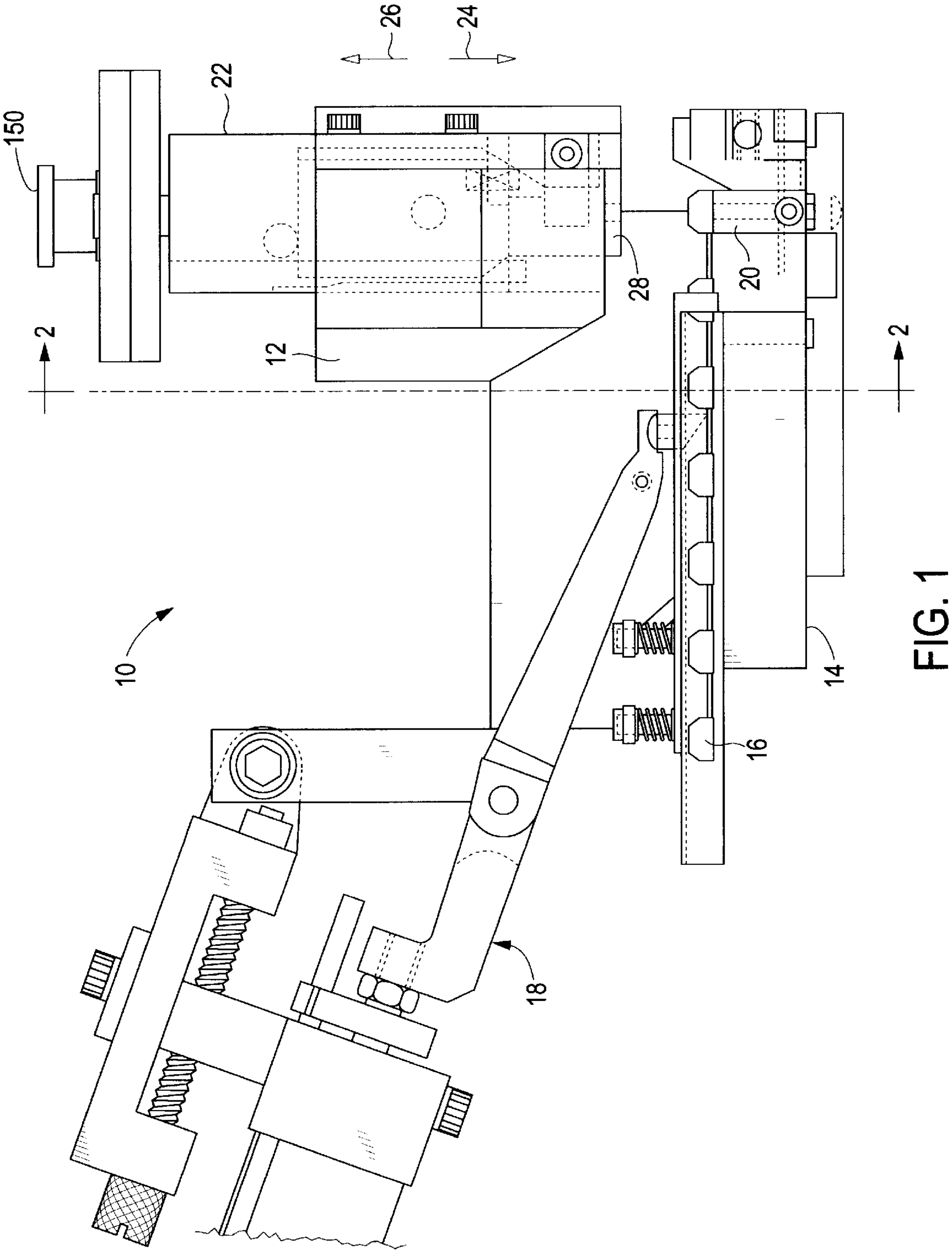
FIG. 1 is a front view of a terminal applicator incorporating the teachings of the present invention.

There is shown in FIG. 1 a terminal applicator 10 having a frame 12, a base 14, and feed track for supporting and guiding a strip of partially assembled terminals 16. A terminal feed mechanism 18 is attached to the frame 12 and is arranged to move the strip of terminals, one terminal at a time, into crimping position on an anvil 20 in the usual manner. A ram 22 is in sliding engagement with the frame 12 and is arranged to undergo reciprocation motion in a crimping direction, indicated by the arrow 24, toward the anvil 20 and in a return direction, indicated by the arrow 26, away from the anvil. The ram 22 carries crimping tooling 28 that cooperates with the anvil 20 in the crimping operation.

Figure 3:
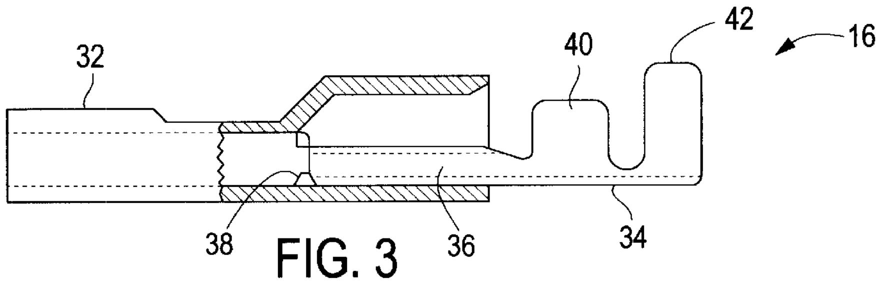
FIG. 3 is a cross-sectional view of a typical two part, partially assembled connector.

The partially assembled terminal 16, as best seen in FIG. 3, includes an insulated housing 32 and an electrical terminal 34. The electrical terminal includes a receptacle portion 36 extending part way into the interior of the housing 32 and is held in place by means of an interference fit with a constriction 38 formed in the housing. The constriction is arranged to allow movement of the terminal further into the housing simply by the application of an additional force on the terminal to overcome the interference. Once past the interfering constriction the terminal moves freely until it is fully seated, at which point a locking member snaps into place to hold the terminal captive within the housing in the usual manner. The portion of the terminal 34 that is exterior to the housing 32, as shown in FIG. 3, includes conductor crimping barrel or tabs 40 and insulation crimping tabs 42, both of which are formed about the wire during the crimping operation and form the electrical and mechanical connections, respectively, with the wire.

Figure 5:
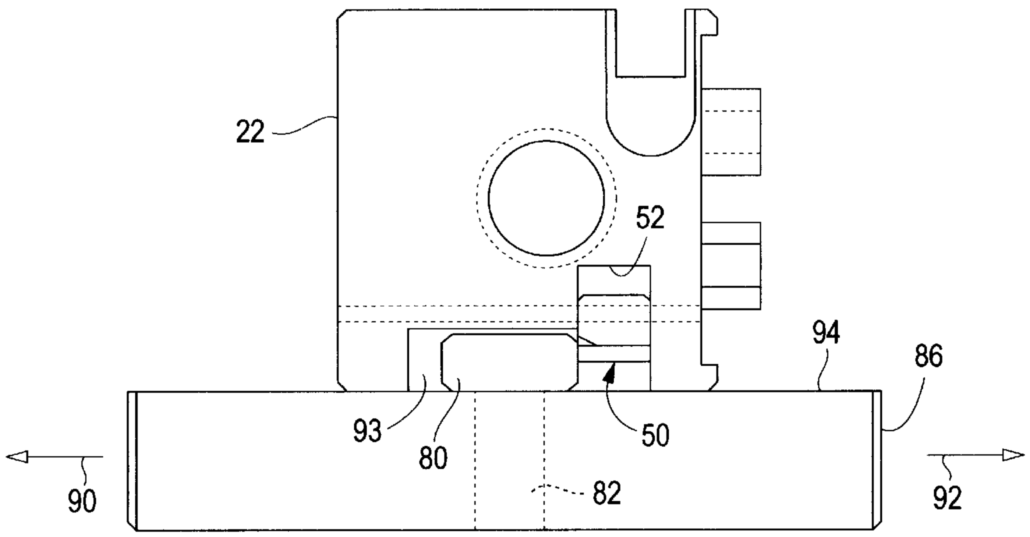
FIG. 5 is a top view of the ram shown in FIG. 4.
Figure 4:
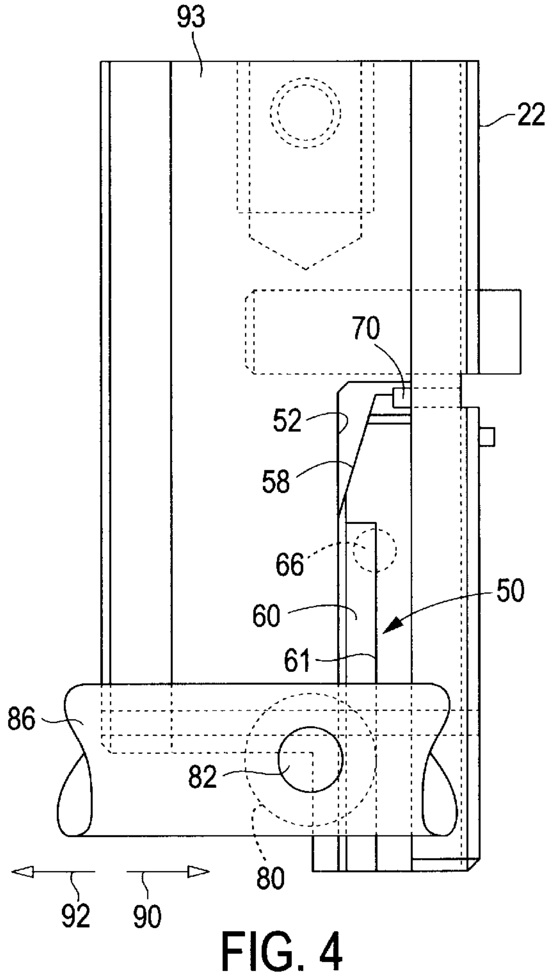
FIG. 4 is a side view of the ram shown in FIG. 2.
Figure 6:
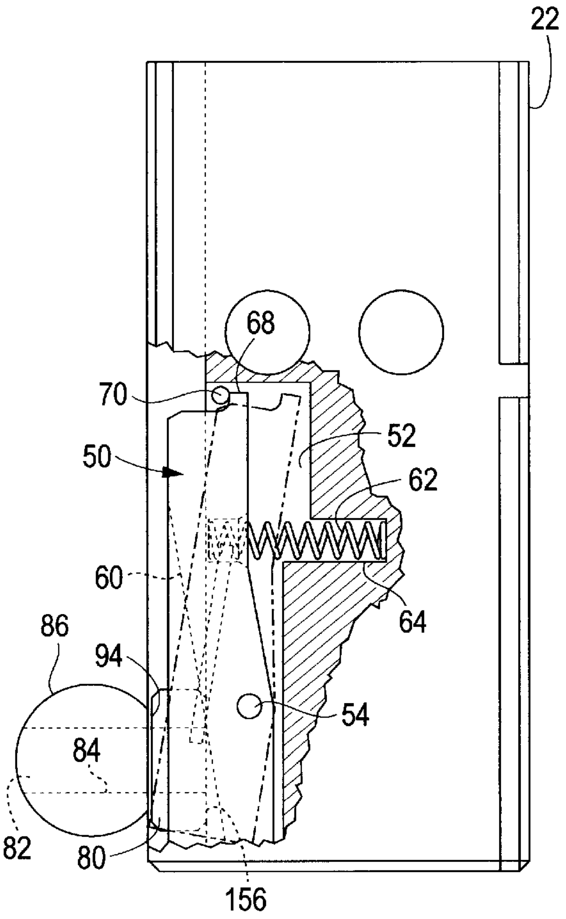
FIG. 6 is a front view of the ram shown in FIG. 4 partially cut away to show the retractable cam.
Figure 7:
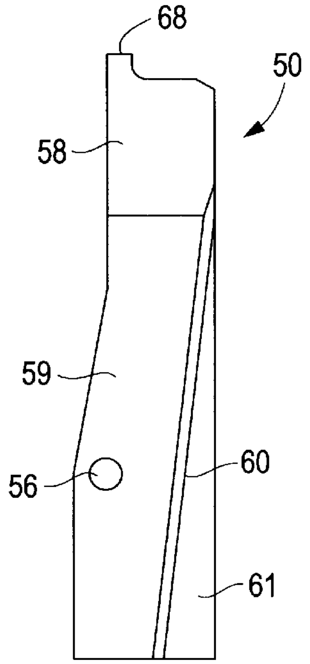
FIG. 7 is a back view of the retractable cam shown in FIGS. 4 and 6.
Figure 8:
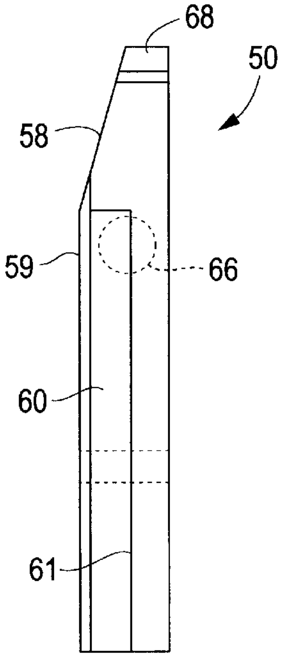
FIG. 8 is a side view of the retractable cam shown in FIG. 7.
Figure 9:
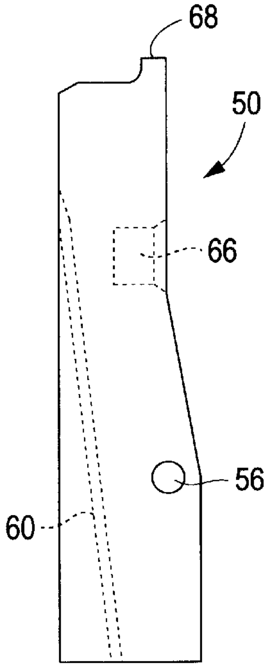
FIG. 9 is a front view of the retractable cam shown in FIG. 7.
Figure 11:
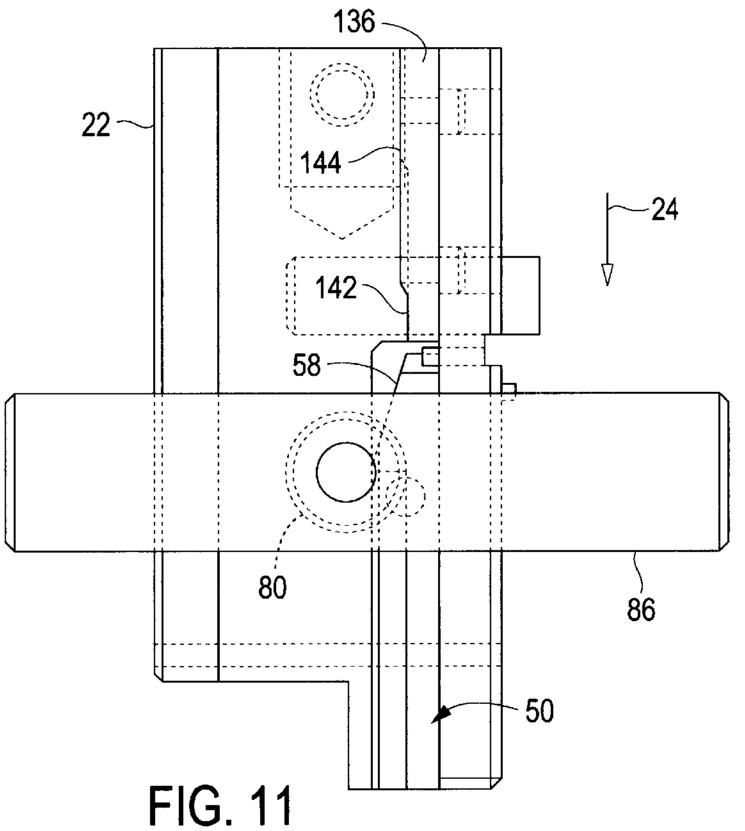
FIG. 11 is a view similar to that of FIG. 10 showing the ram in an intermediate position.

As shown in FIGS. 2, 4, 5, and 6, a retractable cam 50 is positioned within a slot 52 formed in the side surface of the ram 22 and is pivotally attached thereto by means of a pivot pin 54, as best seen in FIG. 6. The cam 50, as shown in FIGS. 7, 8, and 9, includes a slip fit hole 56 for receiving the pivot pin 54, a first cam surface 58 which terminates in a null surface 59, and a second cam surface 60 having an adjacent shoulder 61. The thickness of the cam 50 allows the cam to pivot freely within the slot 52 without appreciable side play. A compression spring 62 extends from a blind hole 64 in the back wall of the slot 52, into a receiving blind hole 66 formed in the side of the cam 50. The spring 62 urges the cam 50 into a first position shown in solid lines in FIG. 6. A stop boss 68 extending from the top of the cam 50 engages a stop pin 70 to limit pivotal movement of the cam. The stop pin 70 extends a short distance from a hole in the side wall of the slot 52, as seen in FIGS. 4 and 6.

Figure 2:
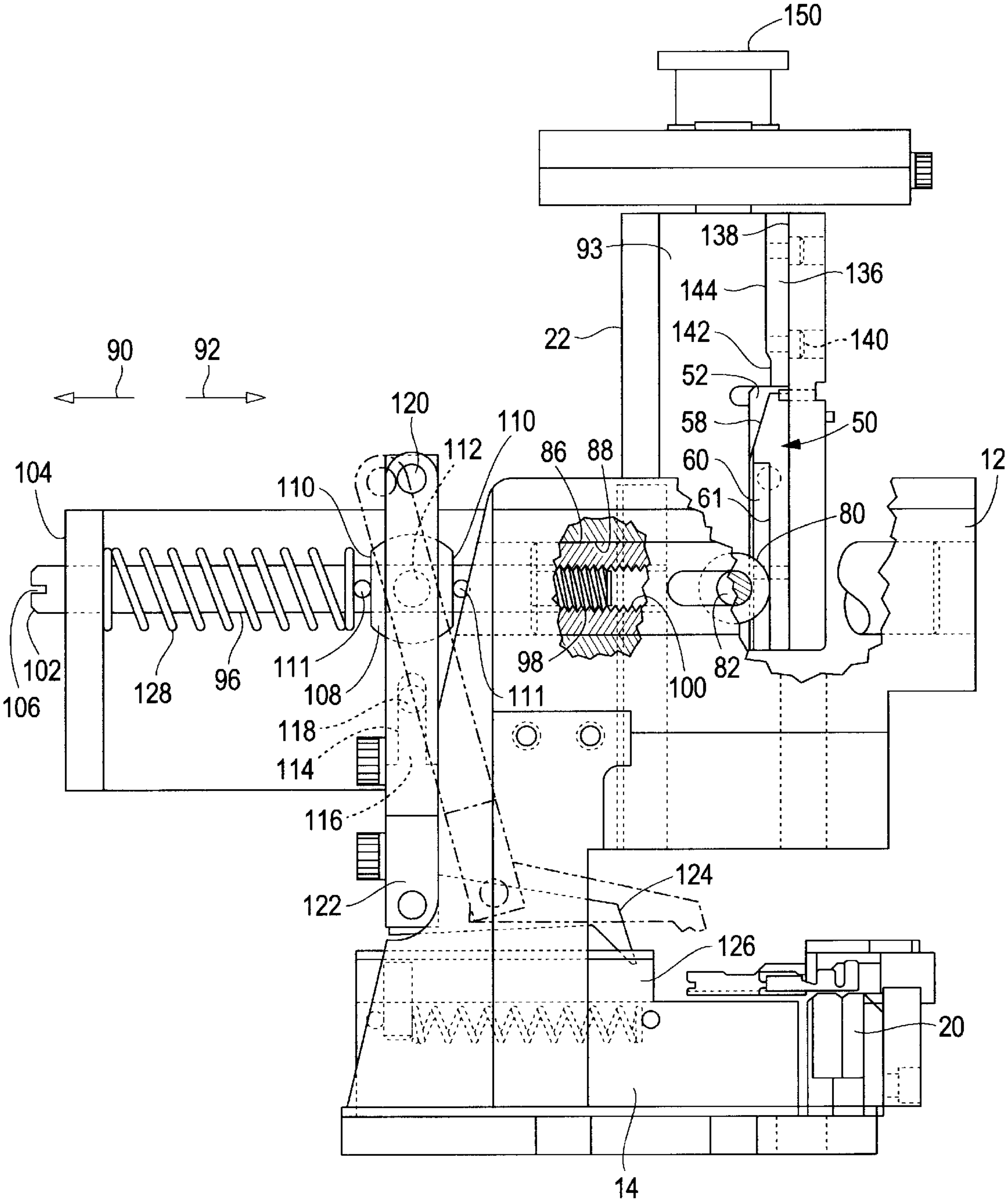
FIG. 2 is a cross-sectional view taken along the lines 2—2 in FIG. 1.
Figure 2A:
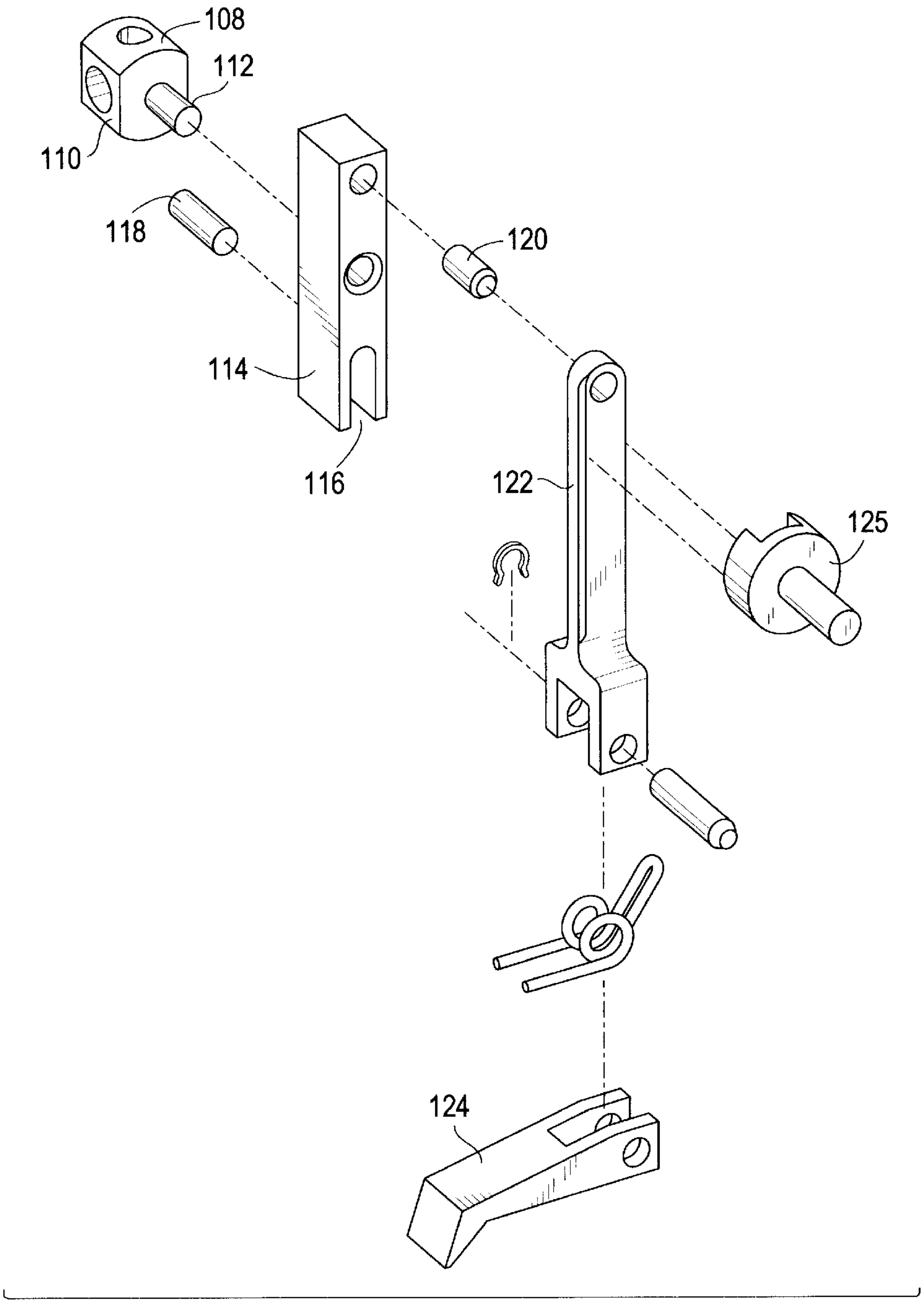
FIG. 2A is an exploded parts view of a portion of the housing feed mechanism shown in FIG. 2.

As best seen in FIGS. 4, 5, and 6, a cam follower roller 80 is journaled for rotation on a pin 82 that is a light interference fit with a hole 84 formed through a cylindrical-shaped feed rod 86. The feed rod 86 extends through a sliding fit bore 88 formed through the frame 12 so that the feed rod is free to slide back and forth within the bore in a feed direction, indicated by the arrow 90, and in an opposite retract direction, indicated by the arrow 92, as shown in FIGS. 2, 4, and 5. As will be explained in more detail below, as the ram 22 moves in its return direction 26, the cam 50 engages the follower roller 80 causing the feed rod 86 to move in the direction 90 while the follower roller moves within a clearance cutout 93 formed in the side of the ram 22. The feed rod 86 includes a flat 94 on one side that rides against the side of the ram 22 and serves to prevent rotation of the feed rod. A feed rod extension 96 includes a threaded end 98 that is threaded into a mating hole 100 in the end of the feed rod 86. The outer end 102 of the feed rod extension is supported in a hole in a flange 104 attached to the frame 12. The outer end includes a screw driver slot 106 to aid in rotating the feed rod extension 96 to adjust its length of extension with respect to the feed rod 86 for a purpose that will be explained. The feed rod extension 96 extends through a lose fit bore in a yoke 108 having a pair of flats 110 on opposite sides thereof. Two pins 111 extend laterally through the feed rod extension so that they straddle the yoke, as shown in FIG. 2. As the feed rod 86 and feed rod extension 96 move axially in the directions 90 and 92, the yoke is carried along. This structure permits rotation of the feed rod extension 96 for adjustment purposes while maintaining the coupling to the yoke 108. As shown in FIGS. 2 and 2A, the yoke 108 includes a pin 112 that pivotally supports a first drive link 114. An open ended slot 116 is formed in the lower end of the first drive link 114, as best seen in FIG. 2A, which receives a fixed pivot pin 118 which is rigidly attached to the frame 12. Another pivot pin 120 extends outwardly from the upper end of the first drive link 114 and pivotally supports the upper end of a second drive link 122 which drives a feed finger 124 in the usual manner. An adjustable pivot mechanism, not shown, is coupled to the second drive link by means of a coupling 125 to permit lengthening or shortening the feed stroke of the feed finger, by moving the coupling 125 up or down, as viewed in FIG. 2A, in the usual manner. A slide 126 is slidingly coupled to the frame 12 and is arranged to move back and forth parallel to the movement of the feed rod 86, in the directions indicated by the arrows 90 and 92. The slide 126 engages and pushes the insulated housing 32 over the electrical terminal 34 during operation of the terminal applicator. A return spring 128 is positioned around the feed rod extension 96 and one end bares against the flange 104 and the other end against one of the two pins 111, as shown in FIG. 2. When the ram 22 is in its full up position, shown in FIGS. 1 and 2, the return spring 128 urges the feed rod 86 in the direction 92. The feed rod extension 96, yoke 112, first and second drive links 114 and 122, and related parts form a feed mechanism that is well known in the art and which, therefore, has not been described in great detail.

A fixed cam 136 is attached to a wall 138 of the clearance cutout 93 by means of screws 140, as shown in FIG. 2. The fixed cam includes a null surface 142 and a stepped cam surface 144. As will be explained below, the fixed cam is positioned on the ram so that the cam surface 144 engages the cam follower 80 during the crimping stroke while the crimping tooling 28 has already started but not yet completed crimping the terminal. The purpose of the fixed cam is to cause the feed finger 124 to push the insulated housing 32 a small distance until the end of the terminal 34 just passes the constriction 38 so that subsequent movement of the insulated housing 32 over the terminal 34 will not be inhibited by the constriction.

Figure 10:
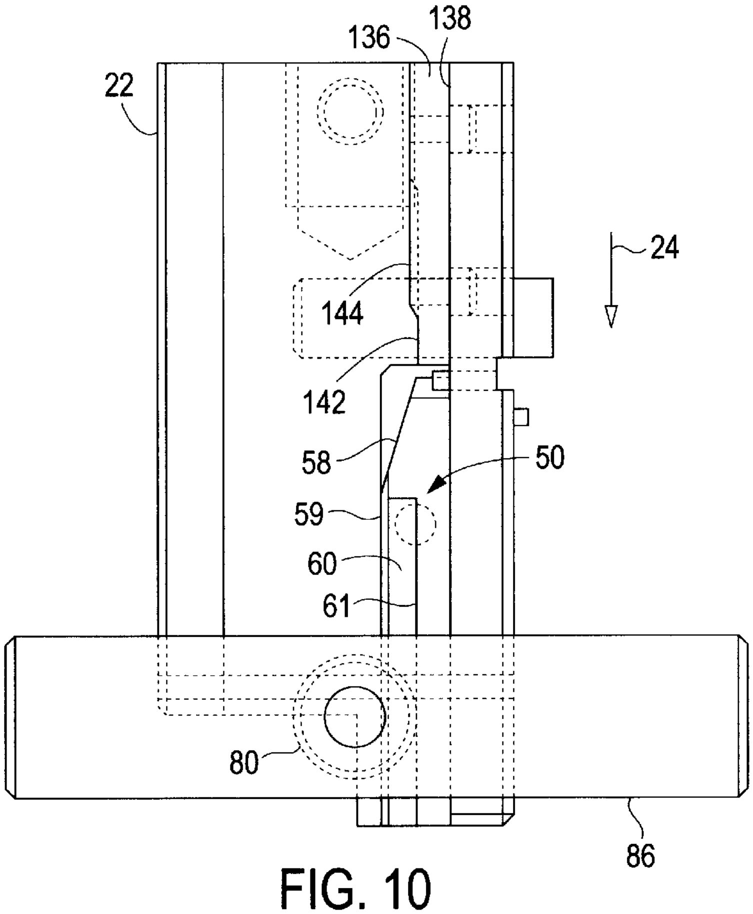
FIG. 10 is a schematic view of the ram and feed rod, shown in FIG. 4, depicting the ram and retractable cam in its upper most position prior to beginning the crimping stroke.

In operation, the terminal applicator 10 is usually secured in a press, not shown, having a press ram that is coupled to the applicator ram 22 by means of a coupling 150 in the usual manner. When the press is actuated, the press ram causes the applicator ram 22 to move through a complete crimping cycle. This crimping cycle includes moving the ram 22 in the crimping direction 24 into crimping engagement with a terminal 34 in position on the anvil 20, and then moving the ram in the return direction 26 to its full up position shown in FIG. 1 while concurrently pushing the insulated housing 32 completely over the crimped terminal 34. Prior to beginning operation, the usual set up functions are performed including accurately positioning the feed finger 124. Positioning the feed finger is done by rotating the feed rod extension 96 either clockwise to move the feed finger 124 to the left, as viewed in FIG. 2 or counterclockwise to move the feed finger to the right. The spring 128 pushing against the pin 111 will hold the feed rod extension in position during operation. The operation of the retractable and fixed cams 50 and 136 during this cycle is more clearly illustrated in FIGS. 4, 6, and 10 through 14. At the beginning of the cycle the ram 22 is in its full up position as shown in FIG. 10. The cam follower 80 is urged against the shoulder 61 of the retractable cam 50 by the spring 128. As the ram 22 is caused to move in its crimping direction 24, see FIGS.

Figure 12:
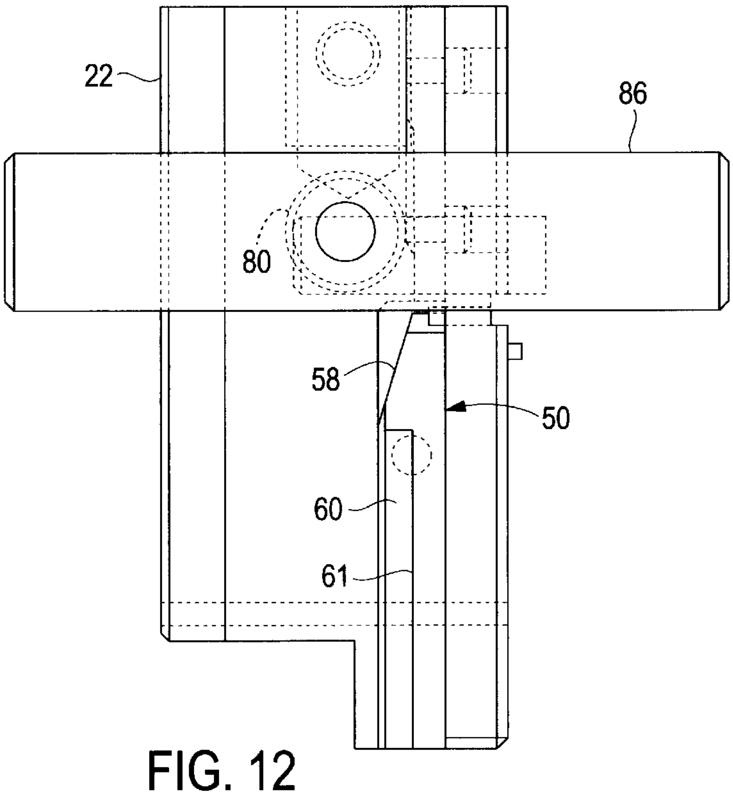
FIG. 12 is a view similar to that of FIG. 10 showing the ram at the bottom of it s crimping stroke.
Figure 13:
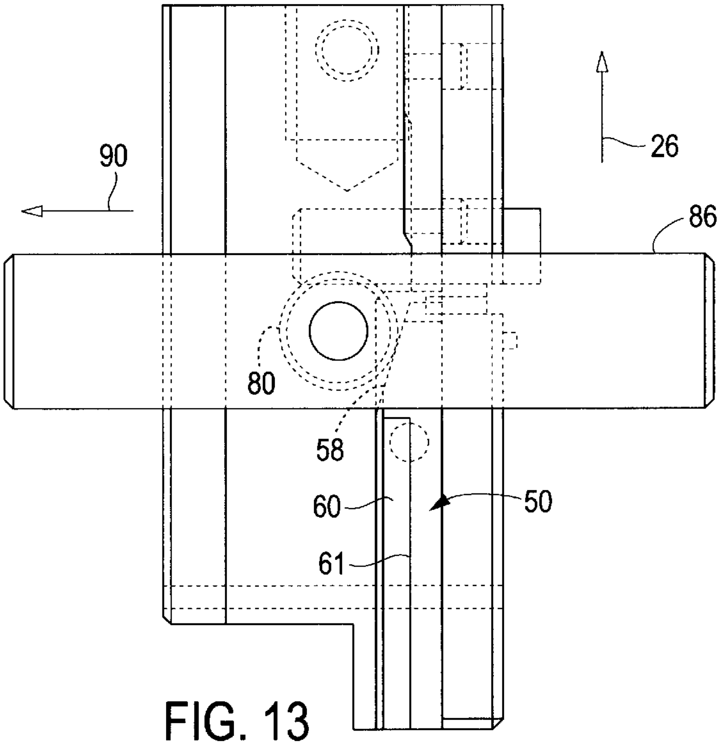
FIG. 13 is a view similar to that of FIG. 10 showing the ram during its return stroke with the retractable cam in engagement with the cam follower.
Figure 14:
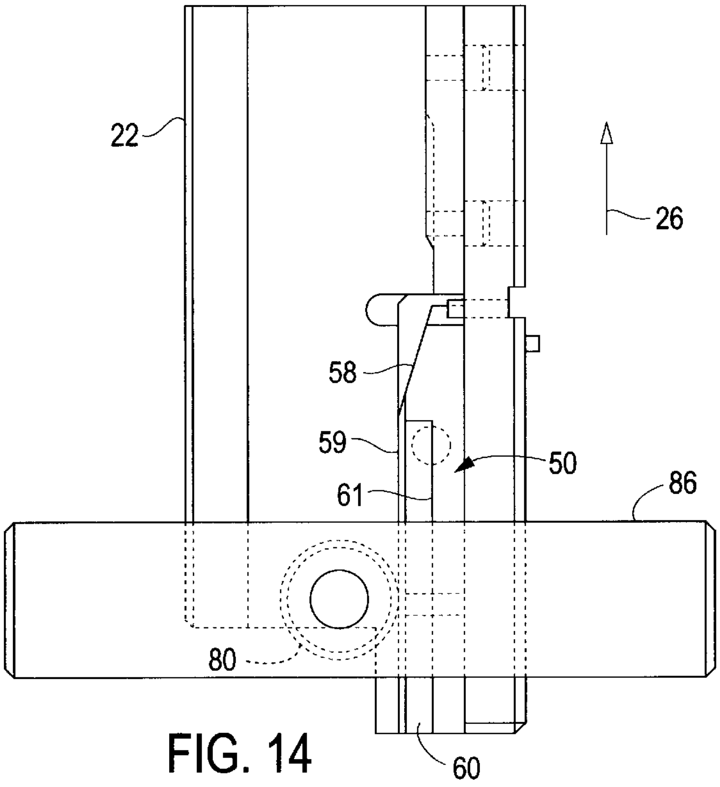
FIG. 14 is a view similar to that of FIG. 10 showing the ram nearing its top most position during its return stroke.

10 and 11, the side 156 of the cam follower 80, shown in FIG. 6, rides against the second cam surface 60 causing the retractable cam 50 to pivot about the pivot pin 54 and into the slot 52. The retractable cam 50 pivots against the urging of the compression spring 62 to the position shown in phantom lines in FIG. 6. As the ram 22 continues moving in the crimping direction 24 the cam follower 80 eventually disengages the retractable cam allowing it to pivot back under the urging of the spring 62 to its starting position shown in solid lines in FIG. 6. The cam follower 80 immediately engages the null surface 142 and then, further movement of the ram causes the crimping tooling to engaged and begin crimping the terminal 34. Before the ram reaches the bottom of its stroke the cam follower 80 rides up onto the cam surface 144, as shown in FIG. 12, causing the follower 80 to move to the left a small amount which, in turn, caused the housing feed mechanism and feed finger 124 to push the insulated housing 32 a small distance to the right, as viewed in FIG. 2, so that the end of the terminal 34 passes the constriction 38. At this point in the cycle the ram reaches the bottom of its stroke, as shown in FIG. 12, and begins to move in the return direction 26. As the ram 22 further moves in the return direction, the first cam surface 58 of the retractable cam 50 engages the cam follower 80, as shown in FIG. 13, causing the follower to move in the feed direction 90, further causing the feed finger 124 to move the slide 126 toward the terminal, as viewed in FIG. 2, and concurrently pushing the insulated housing 32 completely over the terminal 34. At this point in the cycle, the cam follower reaches and rides along the null surface 59, as shown in FIG. 14 until the angled second cam surface 60 moves sufficiently in the return direction 26 that the null surface 59 is no longer in engagement with the follower 80. At this point the follower drops off of the null surface 59 and moves toward the right into engagement with the shoulder 61 to its starting position, as shown in FIG. 10. The above described crimping cycle is repeated as desired.

While the present retractable cam 50 is arranged to pivot about the pivot pin 54 when retracting, it will be appreciated by those skilled in the art that other structures may be used for allowing the retraction movement of the cam during movement of the ram in the crimping direction 24. Such a structure may include a second stop boss 68 and stop pin 70 at the lower end of the cam 50 instead of the pivot pin 54. Further, the retractable and fixed cams 50 and 136 may be incorporated into a single structural unit if desired, or the fixed cam may be an integral part of the ram 22. These and other similar structures are considered to be within the scope and spirit of the appended claims. Further, it will be understood that the teachings of the present invention may be advantageously applied to terminating wires to a connector terminal that is not partially assembled to an insulated housing but, rather one requiring that a different manufacturing operation be performed during the return stroke of the ram.

An important advantage of the present invention is that the retractable cam provides positive actuation of the housing feed mechanism in precise timed relation to the movement of the ram, thereby reducing the required set up time and, during operation, assuring that the assembly is completed prior to beginning the next crimping cycle. Additionally, the retractable cam pivots out of the way during the crimping stroke thereby eliminating any possible interference with the ram and other moving parts, and operationally engages the housing feed mechanism only during the return stroke.

What is claimed is:

1. An apparatus for terminating a conductor to an electrical terminal and applying an insulating housing thereto, said apparatus comprising:

a) a frame;

b) an anvil supported by said frame and arranged to receive an electrical terminal;

c) a ram in sliding engagement with said frame and arrange to undergo reciprocating motion in a crimping direction into crimping engagement with said terminal and in an opposite return direction away from said terminal;

d) a housing feed mechanism coupled to said frame and arranged for effecting application of an insulating housing over said terminal, and e) a first cam coupled to said ram and operatively connected to said housing feed mechanism whereby during movement of said ram in said return direction, said housing feed mechanism is operated to effect application of said insulated housing over said terminal, wherein said first cam is a retractable cam having a first cam surface and wherein said apparatus further comprises a cam follower operatively connected to said housing feed mechanism and arranged to engage and follow said first cam surface only during said movement of said ram in said return direction, wherein said retractable cam is coupled to said ram by means of a pivotal coupling, wherein said retractable cam has a second cam surface arranged so that said cam follower will engage and track said second cam surface and cause said retractable cam to pivot about said pivotal coupling from a first position to a second position thereby preventing engagement of said cam follower with said first cam surface, only during said movement of said ram in said crimping direction, wherein said cam follower has a first follower surface for engaging and following said first cam surface, and a second follower surface for engaging and following said second cam surface, a resilient member arranged to urge said retractable cam into said first position, and wherein said ram includes a cutout for receiving said retractable cam and said pivotal coupling is effected by means of a pivot pin extending through said retractable cam and into holes in said ram on opposite sides of said cutout.

2. The apparatus of claim 1 wherein said resilient means is a compression spring, one end of which is arranged in a hole in said cutout and the other end of which is biased against said retractable cam.

3. The apparatus of claim 1 including a second cam coupled to said ram and operatively connected to said housing feed mechanism whereby only during movement of said ram in said crimping direction, said housing feed mechanism is operated to effect partial application of said insulated housing over said terminal a first incremental amount.

4. The apparatus of claim 3 wherein said second cam is rigidly attached to said ram.

5. In a method of terminating a conductor to an electrical terminal of a partially assembled connector having an insulated housing, utilizing a machine having: a frame; an anvil supported by said frame and arranged to receive a said partially assembled connector; a ram, carrying crimping tooling, in sliding engagement with said frame and arrange to undergo reciprocating motion in a crimping direction into crimping engagement with said terminal and in an opposite return direction away from said terminal; a housing feed mechanism, including a cam follower, coupled to said frame and arranged for effecting application of said insulated housing over said terminal; a first cam coupled to said ram and arranged so that said follower operationally engages said first cam only during movement of said ram in said return direction; and a second cam coupled to said ram and arranged so that said follower operationally engages said second cam during movement of said ram in said crimping direction, said process comprising the steps of:

(1) placing an insulating housing and an electrical terminal in crimping position within said machine;

(2) moving said ram in said crimping direction from a start position whereby said electrical terminal is mechanically and electrically connected to an electrical conductor;

(2a) concurrently with step (2) causing said follower to engage a second surface of said first cam thereby causing said first cam to pivot without effecting said operational engagement of said follower;

(2b) concurrently with step (2), after step (2a) and before step (3) causing said follower to engage said second cam thereby causing said housing feed mechanism to push said insulated housing over said terminal a first incremental amount;

(3) moving said ram in said return direction until said ram is in said start position, and (4) concurrently with step (3) operating said housing feed mechanism to apply said insulated housing over said terminal.

* * * * *